(12) United States Patent  (10) Patent No.: US 11,080,121 B2
Thornhill et al.  (45) Date of Patent: Aug. 3, 2021

(54) GENERATING RUNBOOKS FOR PROBLEM EVENTS

(71) Applicant: International Business Machines Corporation, Armonk, NY (US)

(72) Inventors: Matthew R. J. Thornhill, London (GB); David Griffin, Reigate (GB); Luke Taher, Heswall (GB)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/020,026

(22) Filed: Jun. 27, 2018

(65) Prior Publication Data

US 2020/0004618 A1  Jan. 2, 2020

(51) Int. Cl.
  *G06F 11/07*  (2006.01)
  *G06F 9/455*  (2018.01)
  *G06F 11/00*  (2006.01)
  *G06F 9/54*  (2006.01)
  *G06F 16/907*  (2019.01)

(52) U.S. Cl.
  CPC ...... *G06F 11/0754* (2013.01); *G06F 9/45512* (2013.01); *G06F 9/542* (2013.01); *G06F 11/006* (2013.01); *G06F 16/907* (2019.01); *G06F 2201/86* (2013.01)

(58) Field of Classification Search
  CPC .............................. G06F 11/07; G06F 11/0754
  USPC ...................................................... 714/47.2
  See application file for complete search history.

(56) References Cited

U.S. PATENT DOCUMENTS

| 7,890,802 | B2 | 2/2011 | Gerber |
| 8,533,608 | B1 * | 9/2013 | Tantiprasut ............ G06Q 10/06 715/751 |
| 8,713,436 | B2 | 4/2014 | Cheng |
| 9,104,753 | B2 | 8/2015 | Stuempfle |
| 9,891,971 | B1 * | 2/2018 | Kuhhirte ............. G06F 11/0709 |
| 10,282,248 | B1 * | 5/2019 | Gudka ................ G06F 11/0793 |
| 10,348,767 | B1 * | 7/2019 | Lee ...................... H04L 63/1441 |
| 2005/0033713 | A1 * | 2/2005 | Bala ........................ G06F 9/453 706/59 |

(Continued)

FOREIGN PATENT DOCUMENTS

JP  2014115947 A  6/2014

OTHER PUBLICATIONS

"Proactive Incident and Problem Management", VMware White Paper, Copyright © 2012 VMware, Inc., Palo Alta, CA, Item No. VMW_12Q3_WP_Proactive-Incident_0812_Version 1.0, 17 pages.

(Continued)

*Primary Examiner* — Kamini B Patel

(74) *Attorney, Agent, or Firm* — Stephen R. Yoder

(57) ABSTRACT

Generation, by machine logic, of runbooks for problem events. Generation of runbooks including the following operations: receiving operator commands in a command line interface for an event group relating to an issue, wherein the operator commands resolve the issue; and storing the operator commands as related artifacts of the event group with mapping to affected resources. The method may match arguments of the operator commands to event metadata fields of events in the event group to generalize the arguments to the event metadata and to generate a runbook of generalized operator commands for future instances of an event group of a similar type.

18 Claims, 11 Drawing Sheets

(56) References Cited

U.S. PATENT DOCUMENTS

| | | | |
|---|---|---|---|
| 2009/0172535 A1* | 7/2009 | Cheng | G06F 3/0481 |
| | | | 715/704 |
| 2009/0172537 A1* | 7/2009 | Cheng | G06F 3/0481 |
| | | | 715/704 |
| 2010/0037095 A1* | 2/2010 | Gerber | G06F 11/0709 |
| | | | 714/15 |
| 2010/0042449 A1* | 2/2010 | Thomas | G06Q 10/06 |
| | | | 705/35 |
| 2010/0191771 A1* | 7/2010 | Jones | G06Q 10/06 |
| | | | 707/793 |
| 2012/0016978 A1* | 1/2012 | Bosworth | G06F 9/5055 |
| | | | 709/224 |
| 2012/0303772 A1* | 11/2012 | Ennis | G06N 5/02 |
| | | | 709/223 |
| 2014/0250125 A1* | 9/2014 | Stuempfle | G06F 16/904 |
| | | | 707/737 |
| 2015/0012635 A1 | 1/2015 | Ennis | |
| 2015/0031416 A1* | 1/2015 | Labowicz | H04M 1/271 |
| | | | 455/563 |
| 2016/0224910 A1* | 8/2016 | Deng | G06Q 30/016 |
| 2017/0090736 A1* | 3/2017 | King | G06F 3/04847 |
| 2019/0102459 A1* | 4/2019 | Patterson | G06F 40/295 |
| 2019/0312846 A1* | 10/2019 | Taylor | H04L 63/1483 |
| 2019/0348034 A1* | 11/2019 | Bender | H04N 21/4394 |
| 2020/0177593 A1* | 6/2020 | Bender | H04L 63/107 |

OTHER PUBLICATIONS

Tittel, Ed, "The Shortcut Guide to Run Book Automation", Realtime publishers "Leading the Conversation", sponsored by HP invent, 54 pages, © 2008 Realtimepublishers.com, Inc.

* cited by examiner

500

| | | | | | | | |
|---|---|---|---|---|---|---|---|
| COMMAND 1 511 | 0.4564 | 0.2344 | 0.8712 | 0.4657 | 0.7562 | SA CONF. 521 | 0.55850 |
| COMMAND 2 512 | 0.4122 | 0.2494 | 0.8712 | 0.5957 | 0.1962 | SA CONF. 522 | 0.46494 |
| COMMAND 3 513 | 0.1944 | 0.6479 | 0.8592 | 0.4107 | 0.7342 | SA CONF. 523 | 0.56928 |
| | (P)ERFORMANCE 411 | (L)OGS 412 | COMMAND (H)ISTORY 413 | OTHRT (E)VENTS 414 | (C)ONFIGURATION CHANGES 415 | | |

*FIG. 5*

GENERATING RUNBOOKS FOR PROBLEM EVENTS

BACKGROUND

The present invention relates to generating runbooks for problem events, and more specifically, to generating runbooks based on operator commands.

For an information technology system, there will typically be a requirement to ensure the system is operating correctly and that no parts of the system have failed. When a failure does occur, the teams supporting the system need to know that an issue has occurred and need some way of finding out how to diagnose and fix the issue.

There are existing solutions available for alerting operators to failures within a system. These failures are presented in the form of events, which describe the failure state, where the failure occurred as well as extra metadata around the failure state. If the failure is of a common type, an enterprise will have typically written a list of instructions for the operator describing how to fix the issue in the form of a runbook. If, however there are no existing instructions, the operator will have to manually fix the issue. In many cases, these manual fixes will involve interacting with affected remote systems through a command line interface, using commands which relate in some way to the events generated as a result of the failure.

Once a new issue has been fixed, there is a need for a runbook to be written so that in future operators will have a list of instructions available to fix similar issues. This could be done manually, but it would be beneficial to automatically generate these instructions based on the actions taken by the operator to fix the issue.

In a computer system or network, a runbook is a compilation of procedures and/or operations (typically routine procedures and/or operations) that the system administrator or system operator carries out. System administrators in IT (information technology) departments typically use runbooks as a reference. Runbooks can be in either electronic or in physical book form, and the description of the procedures and/or operations typically includes descriptions in human understandable form and format. A runbook in human understandable form and format is herein sometimes referred to as a "traditional runbook." A runbook typically includes procedures to begin, stop, supervise, and debug a computer or system of interconnected computer devices. Some runbooks also describe procedures for handling special requests and contingencies. Typically, a runbook allows other operators, with appropriate computer experience, to effectively manage/troubleshoot a computer system. Through runbook automation (using a type of computer readable and executable runbook herein sometimes referred to as "automated runbooks"), these processes can be carried out using software tools in a predetermined manner Runbook automation (RBA) is the ability to define, build, orchestrate, manage, and report on workflows that support system and network operational processes. A runbook workflow can potentially interact with all types of infrastructure elements, such as applications, databases, and hardware.

It is known for system administrators to use runbooks to handle "problem events" (sometimes herein referred to simply as "events"). An event is a report of some kind of problem occurring. In response to these events, the operator will perform some kind of action, based on their experience or by using a runbook, to rectify the underlying issue. Problem events include: (i) debugging a computer error (for example, a software error); (ii) handling a software error without debugging it (for example, ignoring an error message); (iii) computer crashes; (iv) too much memory used on a given server; (v) hard drive failure on a server; and/or (vi) software error(s) that causes an application to fail.

Event groups are known. An "event group" is a set of problems that: (i) have been reported in the form of problem events, and (ii) the computer system (or a human user) has determined in some way that they are related. One method of determining whether an event group exists is by determining the probabilistic tendency that a set of events have occurred together in the past. For example, three events that constitute an "event group" include the following: (i) Event 1: Fan failed on Server1; (ii) Event 2: Server1 temperature high; and (iii) Event 3: Server1 offline. In this example, these events tend to occur together because of causal connections between them. Specifically, Event 1 causes air to circulate less and carry less heated air from the vicinity of the server's processor, thereby causing Event 2. The high temperature experienced by the server in Event 2 then causes the server to go offline, which is Event 3.

SUMMARY

According to an aspect of the present invention there is provided a computer-implemented method for generating runbooks for problem events, comprising: receiving operator commands in a command line interface for an event group relating to an issue, wherein the operator commands resolve the issue; storing the operator commands as related artifacts of the event group with mapping to affected resources; matching arguments of the operator commands to event metadata fields of events in the event group to generalize the arguments to the event metadata; and generating a runbook of generalized operator commands for future instances of an event group of a similar type.

As used in this application, a "related artifacts" means that the set of commands entered by the operator in the command line interface (CLI) for a given "event group" are stored in a manner such that the set of commands are linked. In other words, for a given event group, a list of related commands is stored. An example scenario of how a "related artifact" is used and/or implemented is now shown below:

The first event received and correlated can be representatively shown with the following cut down version of the event attributes and/or metadata:
Event 1
   event-type: io_error
   host: vm1.ldn.mycorp.com
   component: /dev/sda1
   identifier: io_error_vm1.ldn.mycorp.com
Event 2
   event-type: file_system_ro
   host: vm1.ldn.mycorp.com
   mount-point: /home
   component: /dev/sda1
   identifier: file_system_ro_vmEldn.mycorp.com
In some embodiments, The operator (with the operator being either an automated computer system or a human user) will start a new CLI session in context of Event 2 and will type the following commands:
   umount/home
   fdisk -y/dev/sda1
   mount/dev/sda1/home The commands entered by the operator would then get "parameterized" by matching (in other words, correlating) the above command arguments and the event attributes (of events 1 and 2). For the majority of commands, arguments will be identifiable in a defined way, typically separated by one or more spaces, and with the argument surrounded in quotes if the argument itself contains a space.

In this present example, by matching the strings extracted from the command arguments to the event attributes, the end result (or product of the matching) is a parameterized set of commands, such as the following:

umount {mount-point}
fdisk -y {component}
mount {component} {mount-point}

However, if a subsequent event group occurs with the same attribute types (io_error and file_system_ro), but have different values for those attributes, the computer system (or human user) can apply the parameterized command set (shown directly above) by filling in the correct values from a new set of problem events.

According to another aspect of the present invention there is provided a system for generating runbooks for problem events, comprising: a processor and a memory configured to provide computer program instructions to the processor to execute the function of provided components; a command receiving component for receiving operator commands in a command line interface for an event group relating to an issue, wherein the operator commands resolve the issue; a command storing component for storing the operator commands as related artifacts of the event group with mapping to affected resources; a command generalizing component for matching arguments of the operator commands to event metadata fields of events in the event group to generalize the arguments to the event metadata; and a runbook generating component for generating a runbook of generalized operator commands for future instances of an event group of a similar type.

According to a further aspect of the present invention there is provided a computer program product for generating runbooks for problem events, the computer program product comprising a computer readable storage medium having program instructions embodied therewith, the program instructions executable by a processor to cause the processor to: receive operator commands in a command line interface for an event group relating to an issue, wherein the operator commands resolve the issue; store the operator commands as related artifacts of the event group with mapping to affected resources; match arguments of the operator commands to event metadata fields of events in the event group to generalize the arguments to the event metadata; and generate a runbook of generalized operator commands for future instances of an event group of a similar type.

According to a further aspect of the present invention, a computer program product (CPP) generates runbooks for problem events. The CPP includes: a computer readable storage medium; and computer code stored on the computer readable storage medium. The computer code includes program instructions executable by a processor(s) set to cause the processor(s) set to perform at least the following operations: (i) receive operator commands in a command line interface for an event group relating to an issue, wherein the operator commands resolve the issue, (ii) store the operator commands as related artifacts of the event group with mapping to affected resources, (iii) match arguments of the operator commands to event metadata fields of events in the event group to generalize the arguments to the event metadata, and (iv) generate a runbook of generalized operator commands for future instances of an event group of a similar type.

According to a further aspect of the present invention, a method, CPP and/or computer system perform the following operations (not necessarily in the following order): (a) receiving a problem-resolution command data set including information indicative of: (i) a plurality of commands used to resolve a first occurrence of a problem event that occurred in operation of a first computer system, and (ii) each given command of the plurality of commands, argument value data respectively corresponding to value(s) of argument(s) of the given command; (b) for each given argument value of each given argument data of each given command of the plurality of commands, determining, by machine logic, a machine logic formula for determining the given argument value based on characteristics and/or operational parameter values of computer systems other than the first computer system; and (c) creating a first script for handling the problem event, the first script including: (i) the plurality of commands, and (ii) the machine logic formulas for given argument value. In some embodiments of this aspect: (a) the script is in human understandable form and format; (b) the first script is in computer executable code; and/or (c) one, or more, of the following operations is performed: (i) responsive to a second occurrence of the problem event in a second computer system, inserting argument values, based on the generalized formulas and characteristics and/or operating parameters of the second computer system, into the first script to create a second-computer-system-specific instantiation of the first script, and/or (ii) using the second-computer-system-specific instantiation of the first script to resolve the second occurrence of the problem event in the second computer system.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 5 is a schematic diagram of an example embodiment of a second aspect of the method of FIG. 2 in accordance with the present invention;

Figure 1:
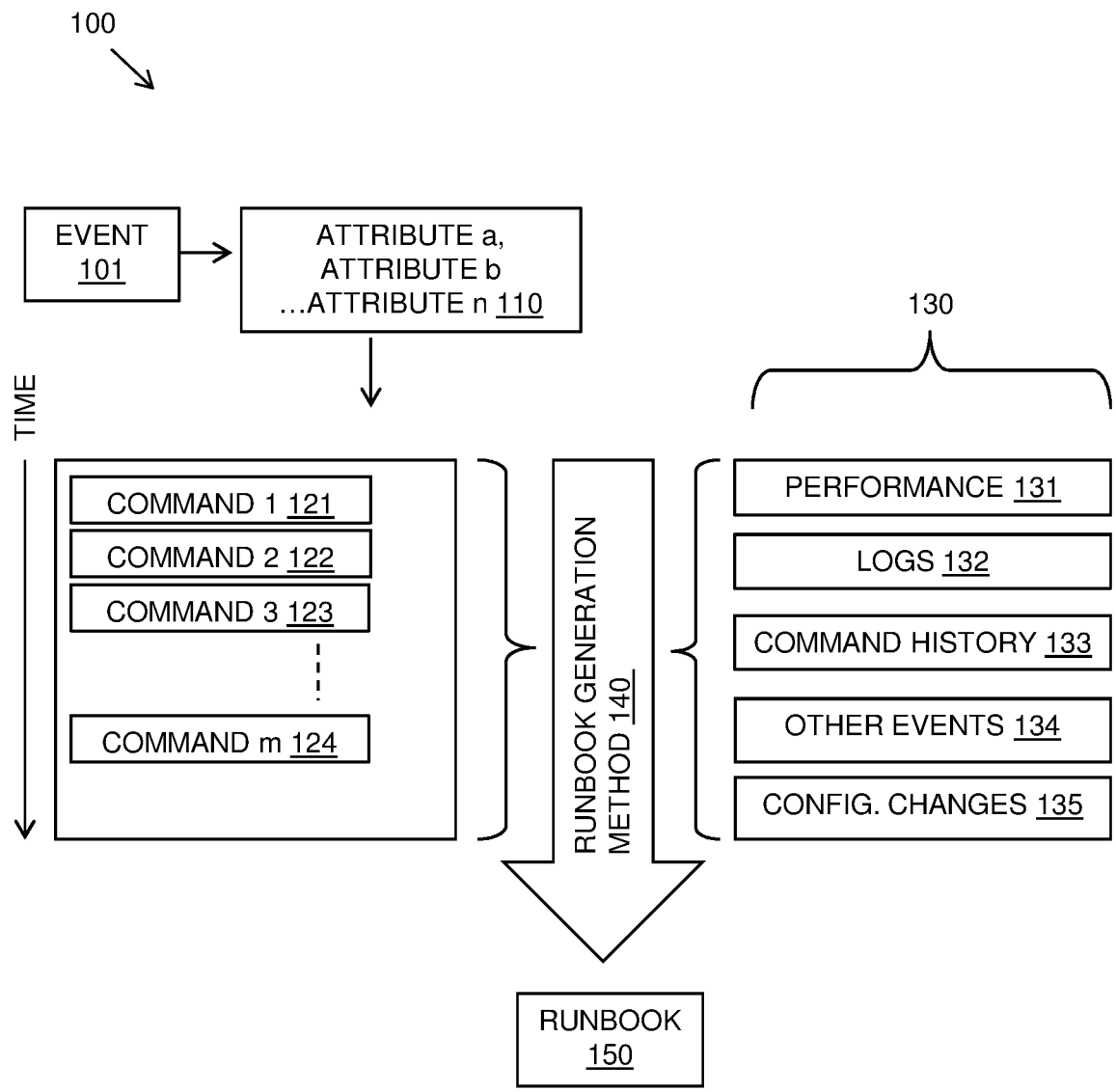
FIG. 1 is a schematic diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method generates automated or semi-automated runbooks based on the monitoring of the command line interface (CLI) commands entered by an operator in order to resolve an issue. A runbook is a compilation of routine procedures and operations that a system administrator or operator may carry out. A runbook is a collection of what are herein referred to as "scripts" (sets of commands for accomplishing some objective on a computer system). While some embodiments of the present invention are described in terms of runbooks, other embodiments of the present invention may entail no more than a single script. A "command" as that term is used herein will generally include: (i) command syntax (sometimes herein simply referred to as the "command"), and (ii) command arguments (parameter description of a parameter used in executing the command—these may be given as "generalized formulas") or argument values (specific parameter values used in executing a specific instantiation of the command). For example, with the command: ACCESS(00000000): (i) ACCESS is the command syntax (or, simply, the command), and (ii) 00000000 is an argument value signifying the 00000000th location in some logical or physical addressing scheme for stored data. As a further example, with the command: ACCESS(the first position in memory): (i) ACCESS is again the command syntax (or, simply, the command), and (ii) "the first position in memory" is a generalized formula that specifies that a data storage location with the earliest, or first, specific address should be read (although the argument value will depend on the actual addressing scheme used in the context in which the command is being performed).

A failure or issue is presented in the form of events, which describe the failure state, where the failure occurred, as well as metadata around the failure state. Based on analysis of mappings between sets of events, the metadata included in these events, and the commands used by operators to resolve the cause of these events, automated runbooks may be generated which can be applied to other computer resources that encounter similar "events."

The method generalizes the commands through matching of arguments with event metadata and enhances the detection of problem-resolving commands through correlation with event resolution. The method utilizes knowledge available from the execution of user interactions in the context of an event. The generalization of the commands allows the runbooks to be reused for similar, but not identical events.

Existing technology is available to correlate multiple events that share a root cause into a single container and present this single container to an operator. This grouping of events can then be matched against existing runbooks in order to indicate a potential solution to the operator. The described method deals with the case where there is no existing runbook that is applicable to the current group of events.

Some embodiments of the present invention may include one, or more, of the following features, characteristics, advantages and/or operations: (i) generation of automated or semi-automated runbooks based on the monitoring of the CLI commands entered by an operator in order to fix an issue; (ii) commands are to be monitored in context of one or more events resulting from a failure of one or more resources; (iii) based on analysis of the mapping between sets of events, the metadata included in these events and the commands used by operators to fix the cause of these events; (iv) automated runbooks can be generated which can be applied to other resources which develop similar faults; (v) utilize the extra knowledge available from the execution of these interactions in context of an event; and/or (vi) by taking advantage of this extra knowledge, generalize the commands through matching of arguments with event metadata and enhance the detection of problem-resolving commands through correlation with event resolution.

Some embodiments of the present invention may include one, or more, of the following features, characteristics, advantages and/or operations: (i) the generalization of the commands allows these runbooks to be reused for similar, but not identical events; (ii) a technique to collect and analyze one class of incident addressing steps and associated textual CLI commands; (iii) allows for these CLI commands to be used to generate a discrete set of weighted incident addressing steps that can then be used as a resolution for future incidents; (iv) allows for entirely new runbooks to be generated automatically from operator interactions with affected devices, without the need for an existing runbook to be selected; (v) a process for analyzing a workflow and generating a runbook from said workflow; (vi) uses external methods of identifying similarity and uses said external method to identify future uses of the runbook; and/or (vii) a way to derive meaning from the commands alone, as well as determining if a command influences a remote system that does not have comprehensive state change monitoring.

Some embodiments of the present invention may include one, or more, of the following features, characteristics, advantages and/or operations: (i) methods of determining if a command influences the system without requiring the entire state of every system that could be affected to be captured at all points in time; (ii) textual analysis of the commands, through analysis of monitoring and logging of remote systems and through the matching of resolution events associated with the incident to operator commands; (iii) works when the operator issued commands affect multiple systems and it requires less infrastructure to give results as there is no need for a dedicated state tracking system to be installed on each device; (iv) takes advantage of this additional context in order to allow for the generalization of sets of commands, utilizing the attributes associated with an event to match parameters issued within commands; (v) allows the commands sets mined by our system to be applied to a wider variety of issues, not just those which require the exact commands issued; (vi) a method for automatically creating runbooks based on previous operator actions, negating the need for administrators to manually create runbooks themselves; (vii) determining the runbook, including step to match arguments with metadata; (viii) uses 5 stages to create runbooks; (ix) ability for front line staff (first responders) to fix and create the runbook; and/or (x) a method for gathering what VMware refers to as 'runbook instructions' and methods for identifying when to execute said runbooks.

Referring to FIG. 1, a schematic diagram 100 illustrates the described method. An operator is given the opportunity to connect to a host in a context of an event or incident 101, which in turn is in the context of a group of events. The event 101 has multiple attributes 110 (Attribute a, Attribute b, . . . Attribute n) providing event metadata. This may be fields that relate to the event, as well as where the event occurred. For example, these may be an identifier of a failed disk, a hostname of a failed machine, a process identifier of a failed process, etc.

The operator may input a series of commands 121, 122, 123, 124 (Command 1, Command 2, Command 3, . . . Command M) during a period of time. For example, the series of commands that may result in a resolution of the event may be as follows, with each command having arguments:

$ command1 --arg1 a --arg2 b . . . --argN g
command1 output
$ command2 --arg1 h --arg2 i . . . --argN n
command2 output
$ command3 --arg1 a
command3 output Arguments are a form of variables that can be instantiated with appropriate number values to be used as an input to the execution of a program.

The method gathers data from resources 130, for example, in the form of performance 131, logs 132, command history 133, other events 134, configuration changes 135, and uses these resources for runbook generation method 140 that ultimately creates runbook 150 for the event resolution. The other events 134 may occur shortly after execution of a command and may be identified as being related.

The description below provides details of the runbook generation method 140.

Figure 2:
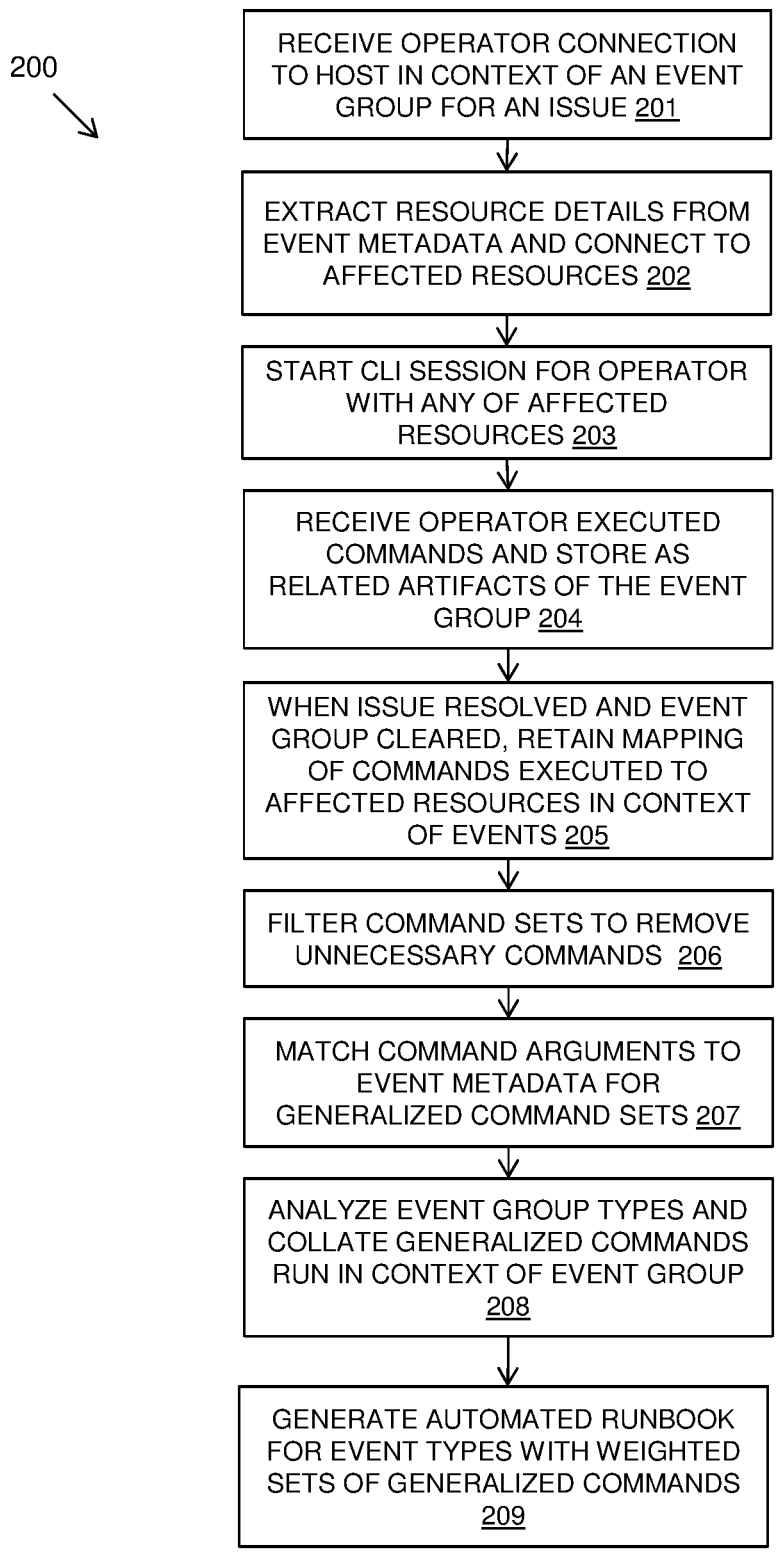
FIG. 2 is a flow diagram of an example embodiment of a first method in accordance with the present invention.

Referring to FIG. 2, flow diagram 200 shows an example embodiment of the described method of method 140 (as shown in FIG. 1) as carried out by an event management application.

The method may receive 201 an operator connection to a host in a context of an event group for an issue or incident. The method may extract 202 the details required to connect to affected resources by extracting these details from the metadata of the problem events as given by the attributes described above.

A command line interface (CLI) session may start 203 with any of the resources affected by the problem events, or to a custom resource, through the interface of the event management application.

The method may receive 204 commands executed on the host by the operator in order to resolve the issue. Any commands entered in CLI session(s) created through the CLI interface, during the lifetime of this event group, are monitored and stored as related artifacts of the event group. Further details of this aspect are described in relation to FIG. 3 below.

After the issue has been resolved and the group of events has cleared, the method may retain 205 the information of which commands were executed against the affected resources in the context of the event group.

Figure 4:
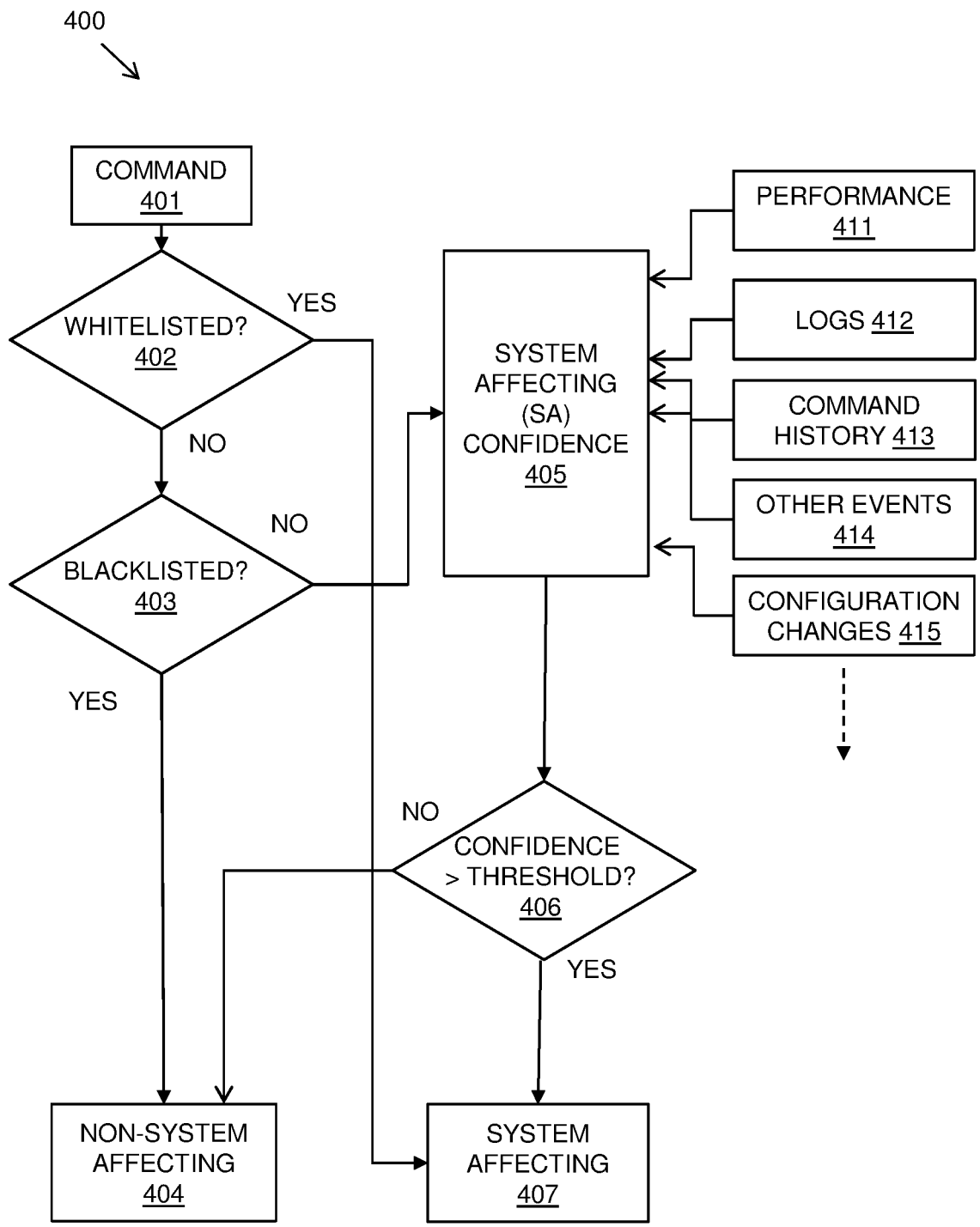
FIG. 4 is a flow diagram of an example embodiment of a second aspect of the method of FIG. 2 in accordance with the present invention.

The method may filter 206 the command sets in order to remove any commands which do not result in any changes in system state and further details are given of this aspect in relation to FIG. 4.

The method may match 207 command arguments to event metadata for command set generalization. Further details of this aspect are described in relation to FIG. 6.

The described method derives meaning from the commands as well as determining if a command influences a remote system that does not have comprehensive state change monitoring. This is achieved through several methods, including: (i) textual analysis of the commands, (ii) analysis of monitoring and logging of remote systems, and (iii) matching of resolution events associated with the incident to operator commands.

The method may analyze 208 multiple historic occurrences of a group of event types and collates the sets of filtered and parameterized commands run in context of each group. Each event has an event type attribute that describes the type of event. For example, this may be fan_failure/ process_failed, etc. When looking at a group level, the matching may be performed against the set of event types within the group.

This acts to build a list of generalized command sets which have previously been used to fix issues of this type, along with a weighting based on the number of times the given set of commands has been applied to these issues and whether or not they resulted in event resolution.

For command sets that have sufficient weighting, an automated runbook is generated 209 by the system that can enact the commands on resources which exhibit the same issue.

Figure 3:
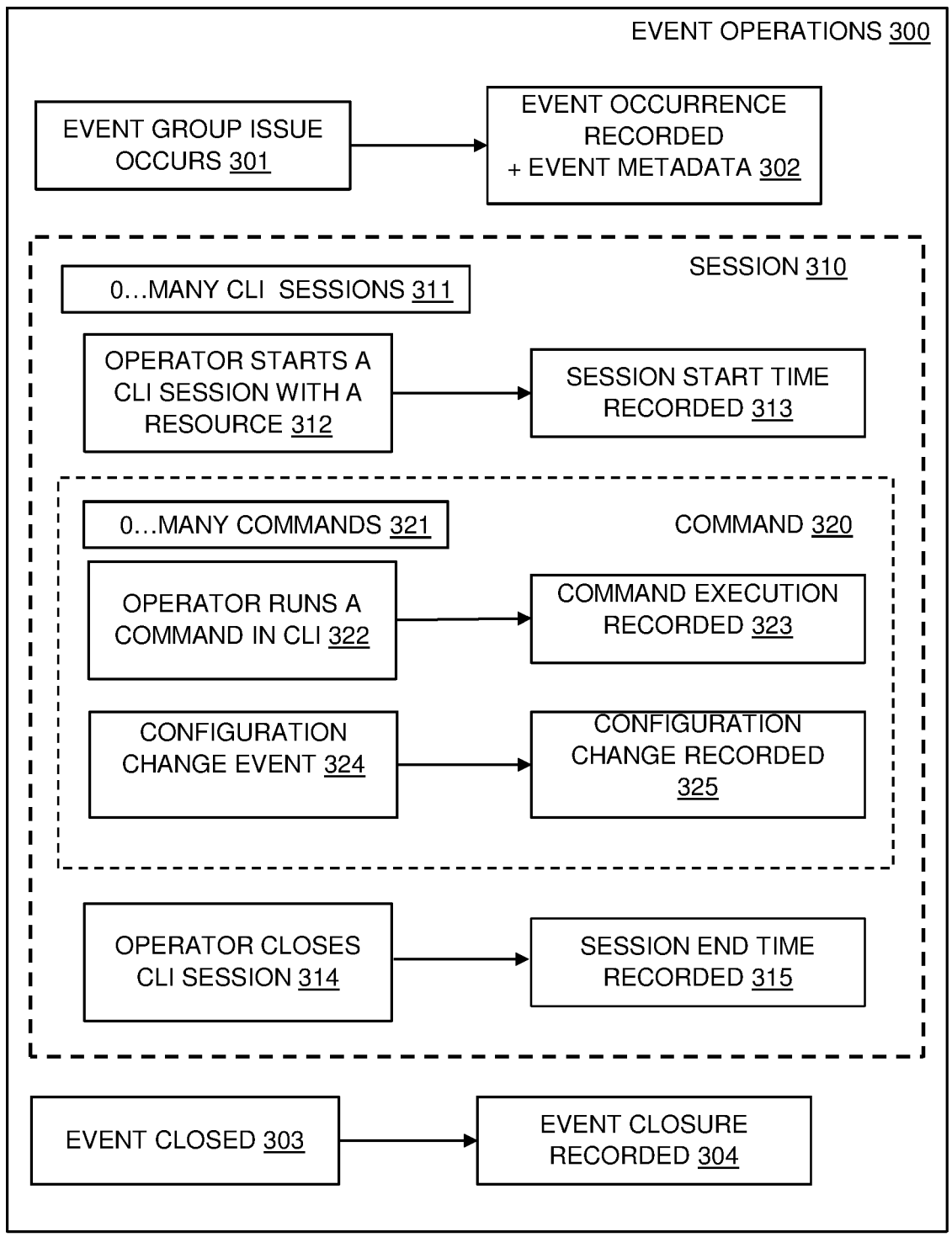
FIG. 3 is a schematic diagram of an example embodiment of a first aspect of the method of FIG. 2 in accordance with the present invention.

Referring to FIG. 3, a schematic diagram illustrates event operations 300 in which an operator executes commands to resolve an issue as received in step 204 of FIG. 2. An event group for an issue occurs 301 and the occurrence is recorded 302 together with event metadata.

Within the event operations 300, zero to many CLI sessions 311 may be carried out and within each session 310, an operation may start 312 a CLI session with a resource and record 313 the session start time. Within a session 310, the operator may execute zero to many commands 321. For each command 320, the operator runs 322 a command in the CLI and the command execution is recorded 323. If there is a configuration change event 324, the configuration change is recorded 325.

When all commands 320 have been operated in a session 310, the operator closes 314 the CLI session and the session end time is recorded 315.

The event closes 303 and the event closure is recorded 304 if the operator was successful in resolving the issue and the monitoring system informs the event management system that the problem is resolved.

Configuration changes are linked with command if they occur within a small time window and there are no other actionable commands run between the first command and the change.

Referring to FIG. 4, a flow diagram 400 provides more details of an example embodiment of the step 206 of FIG. 2 of filtering the command sets.

A command 401 is matched against pre-defined sets of commands which are known to be "system-affecting" (sometimes referred to as "whitelisted") or "non-system affecting" (sometimes referred to as "blacklisted"). In some embodiments, the method of flow diagram 400, at decision step 402, determines whether a command is whitelisted 402. If the command is whitelisted, the whitelisted command is categorized as system affecting 407. If the command is not determined to be "whitelisted," the method proceeds to decision step 403. At decision step 403, the method determines whether the command is "blacklisted" and, if so, the command is categorized as "non-system affecting" at step 404.

For commands that do not match the whitelists or blacklists, the method, at step 405, calculates a system-affecting (SA) confidence score, or probability, for each command that is designated as "system-affecting." This probability, or SA confidence score, may be calculated through the combination of a number of sources, illustrated by performance 411, logs 412, command history 413, other events 414, configuration changes 415, etc.

In some embodiments, other events 414 includes the following: when the operator (whether the operator is a computer system or a human user) enters a command into a computer system, the command can trigger an "event" as a direct consequence of the action carried out (that is, the command that was entered by the operator). This could be in the form of a resolution event which: (i) marks a part of an issue of the problem event as being resolved, or (ii) a new problem event which shows the issue being worsened.

In some embodiments, configuration changes 415 includes monitoring changes on the computer system that the commands are being executed against using a change tracking solution. The presence of these changes indicates that the command was system-affecting because it caused a configuration change. Some examples of configuration changes 415 include the following: (i) changing the Internet Protocol (IP) address of a computer system; (ii) re-starting a network interface; and/or (iii) changing a log retention policy.

For example, the system affecting (SA) confidence score may be determined, in part, upon the following:

a. Matching commands against pre-defined sets of commands which are known to be system affecting or non-system affecting.

b. Determining the frequency of use of the command from the previous command history of a given resource.

c. Through use of monitoring of system configuration through a configuration management solution to determine which commands caused configuration changes on a resource.

d. Monitoring of changes to the file system of a resource to determine which commands enacted changes.

e. Measuring changes in performance metrics of affected resources in order to determine if the commands changed the metrics in a statistically significant way.

f. Monitoring of changes to the resolution status of the event group to determine which commands or sessions enacted changes.

It may be determined, at decision step 406, whether the SA confidence score value of a given command is greater than a predefined threshold value. If so, the command is categorized as "system-affecting" at step 407. If the SA confidence score value is below the predefined threshold value, then the command is categorized as "non-system affecting" at step 404.

FIG. 5 illustrates an example calculation 500 of a confidence or probability of each command 511, 512, 513 being system affecting with sources 411, 412, 413, 414, 415 used to result in the system affecting (SA) confidence scores 521, 522, 523.

In one embodiment, $$SA\ \text{confidence} = \frac{w_0 P + w_1 L + w_2 H + w_3 E + w_4 C}{n}$$

Where n=5, weight vector $$W = \begin{bmatrix} 1 \\ 1 \\ 1 \\ 1 \\ 1 \end{bmatrix} \text{ and threshold} = 0.5$$

P, L, H, E, C: 1=Full confidence|0=No confidence.

Therefore, in the scenario illustrated in FIG. 5, Command 1 511 and Command 3 513 both have SA confidence scores 521, 523 above the threshold of 0.5 and are therefore categorized as system affecting; whereas Command 2 512 has an SA confidence score 522 below the threshold of 0.5 and is therefore categorized as non-system affecting.

Figure 6:
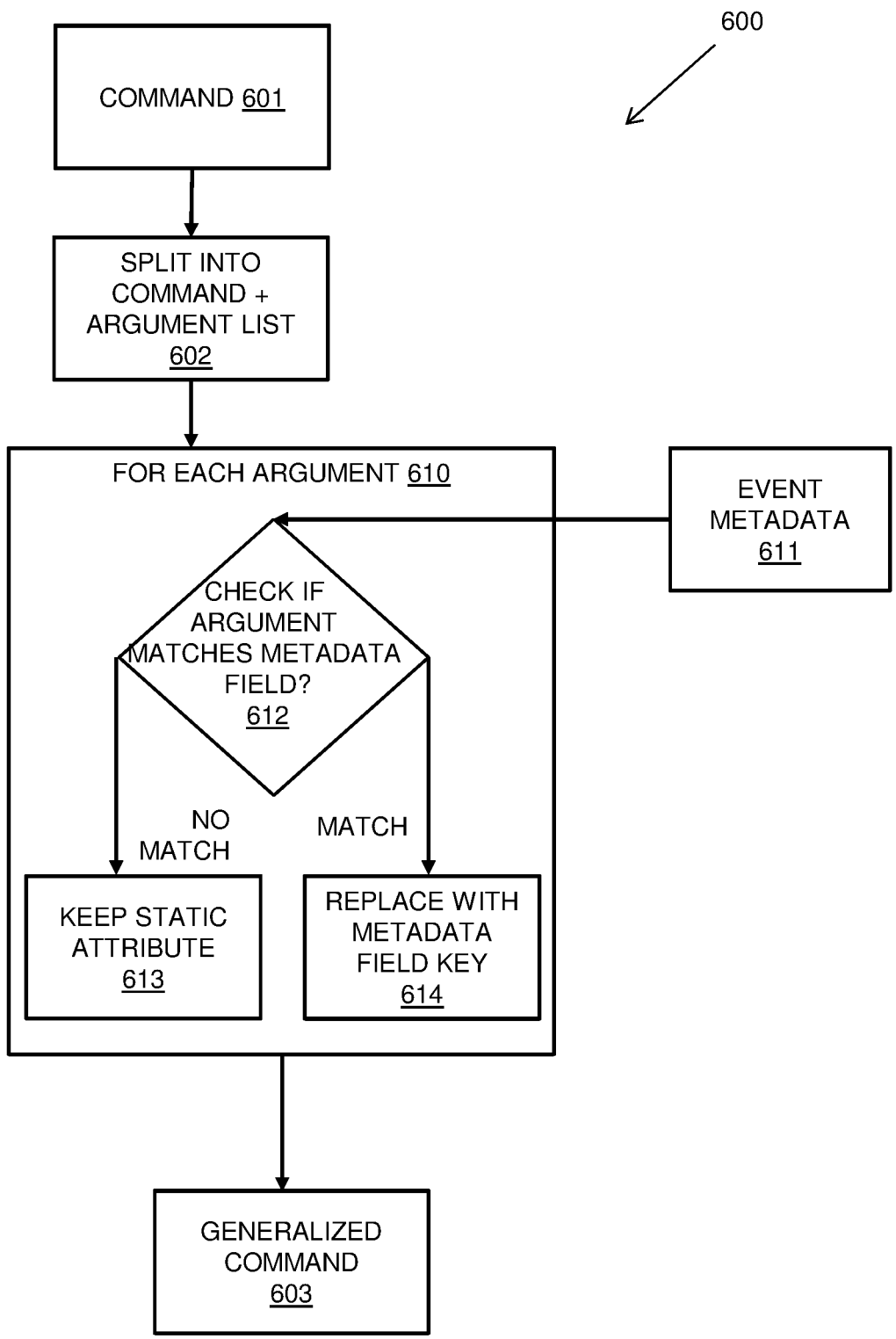
FIG. 6 is a flow diagram of an example embodiment of a third aspect of the method of FIG. 2 in accordance with the present invention.

Referring to FIG. 6, flow diagram 600 shows further example details of step 207 of FIG. 2 for matching command arguments to event metadata in order to "generalize" a given set of commands.

Each recorded command (step 601) is split into a command and a list of arguments (at step 602). For each given argument (step 610), the method may check if the argument matches a metadata field (decision step 612) of the event metadata (at step 611) for each event in the event group. If there is no match, the attribute is kept static (step 613). For any matches, the matching tokens are replaced (at step 614) with parameters allowing the commands to be used for other resources affected by similar issues. In this way, the command is generalized (step 603).

An example scenario is provided for a system experiencing an issue with its primary hard disk. Examples in the form of cut down versions of the event attributes/metadata are provided:

Event 1
event-type: io_error
host: vm1.ldn.mycorp.com
component: /dev/sda1
identifier: io_error_vm1.ldn.mycorp.com
Event 2
event-type: file_system_ro
host: vm1.ldn.mycorp.com
mount-point: /home
component: /dev/sda1
identifier: file_system_ro_vm1.ldn.mycorp.com The operator then starts a new CLI session in context of Event 2 and types the following commands:
umount /home
fdisk -y /dev/sda1
mount /dev/sda1 /home This is then parameterized by matching between the command arguments (in italics) and the event attributes. For the majority of commands, arguments may be identifiable in a defined way, typically separated by one or more spaces, and with the argument surrounded in quotes if the argument itself contains a space.

In this case, by matching the strings extracted from the command arguments to the event attributes, the following parameterized set of commands is obtained:
umount {mount-point}
fdisk -y {component}
mount {component} {mount-point}

If a subsequent event group occurs with the same types (io_error and file_system_ro), but have different values for those attributes, the system may apply this parameterized command set by filling in the correct values from the new events.

Figure 7:
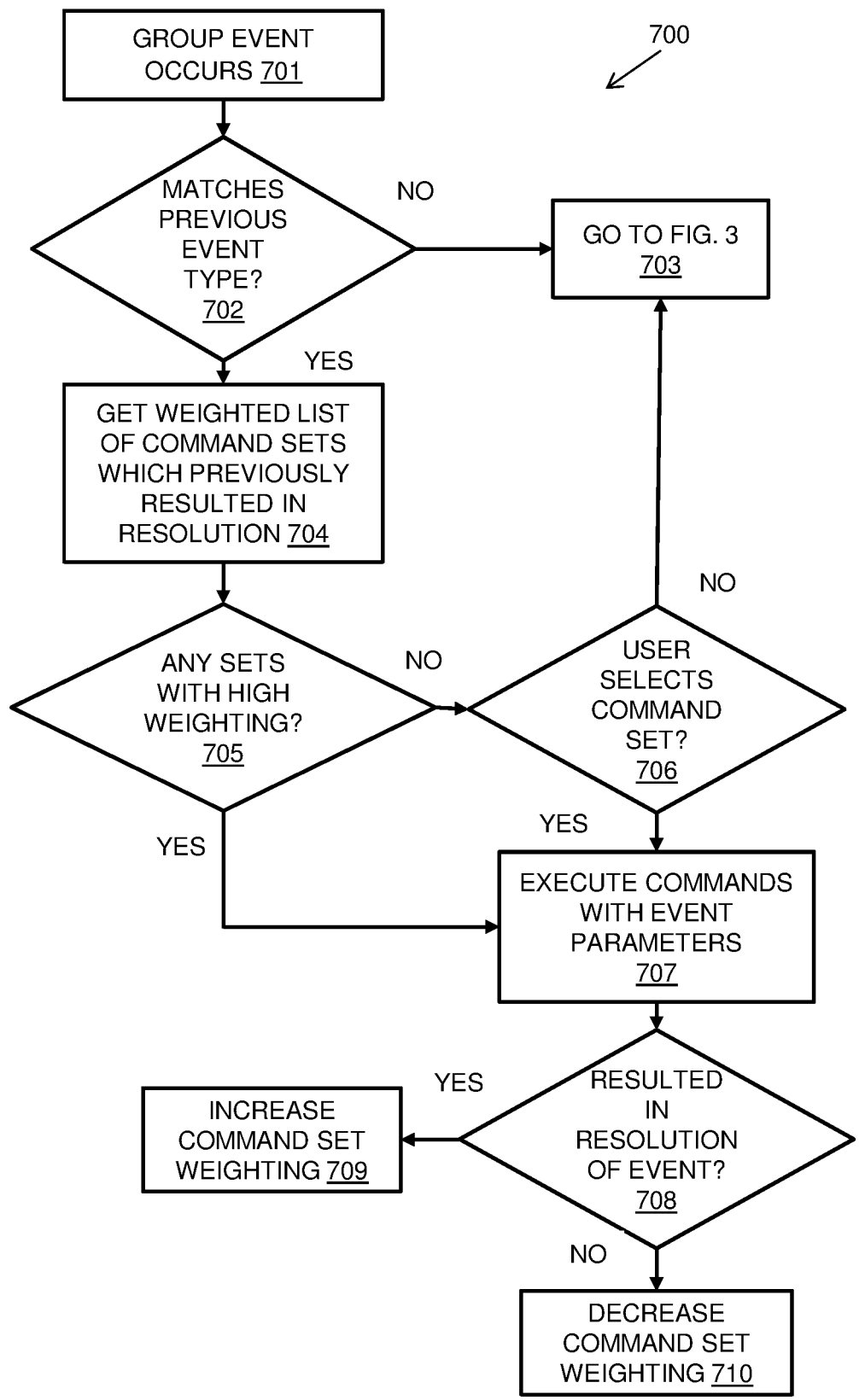
FIG. 7 is a flow diagram of an example embodiment of a second method in accordance with the present invention.

Referring to FIG. 7, a flow diagram 700 shows an example embodiment of an aspect of the described method. After the method has sufficient data to build an automated runbook, the following method may be followed on a subsequent occurrence of a similar issue.

The event management application may correlate the problem events emitted by the affected resources into a grouping of related events to produce a group event (step 701).

The method may determine whether to match a previous event type(s) to current events (at decision step 702). If there is no match, the method proceeds to the operations of FIG. 3 to record commands of an operator for the event group.

If there are matched event types, the method, in some embodiments, identifies the events as having the same cause as the previous occurrences and will consequently associate the event group with an automatically generated runbook. In some embodiments, the automated runbook gets a weighted list of generalized command sets that previously resulted in resolution (step 704).

In some embodiments, the method determines whether any command sets have a high weighting of resolution of step 208 of FIG. 2 (at decision step 705). Based on the weighting level, some embodiments of the method automatically execute the generated runbook with commands with event parameters (step 707), or present it to the user (or operator) for the operator to select the command set (at decision step 706). If the operator does not select the command set, the method proceeds to the operations of FIG. 3 to record the commands for the event group (step 703).

The parameterized arguments for the command sets are filled from the metadata of this occurrence of the event group and the commands are executed against the associated resources.

It may be determined, at decision step 708, whether the execution of the runbook resulted in resolution of the event. If the execution of the runbook resulted in the resolution of the event, then the command set may be increased in weighting (at step 709). If not, the command set may be decreased in weighting (at step 710).

If the operator was asked for confirmation, the operator may be asked, after the execution of the runbook, if it was successful in resolving the event. If it was, the weighting rating of the runbook is increased. In some embodiments, if the runbook was run automatically, the weighting rating of the runbook would be increased if event resolution occurred, or decreased if the event remained open.

The described method and system utilize the knowledge available from the execution of user interactions in the context of an event.

A technique is described to collect and analyze textual CLI commands. The technique allows CLI commands to be used to generate a discrete set of weighted incident-addressing steps that can then be used as a resolution for future incidents.

This allows for entirely new runbooks to be generated automatically from operator interactions with affected resources and devices, without the need for an existing runbook to be manually selected.

The described method includes determining if a command influences the system without requiring the entire state of every system that could be affected to be captured at all points in time. The described method derives meaning from the commands as well as determining if a command influences a remote system that does not have comprehensive state change monitoring.

This is achieved through several methods, including: (i) textual analysis of the commands, (ii) analysis of monitoring and logging of remote systems, and (iii) matching of resolution events associated with the incident to operator commands. This has the advantage of working when the operator issued commands affect multiple systems and it requires less infrastructure to give results as there is no need for a dedicated state tracking system to be installed on each device.

The described method takes advantage of additional context provided by an event generated directly from monitoring the affected system in order to allow for the generalization of sets of commands, utilizing the attributes associated with an event to match parameters issued within commands. This allows the command sets mined by the described method to be applied to a wider variety of issues, not just those which require the exact commands issued.

Figure 8:
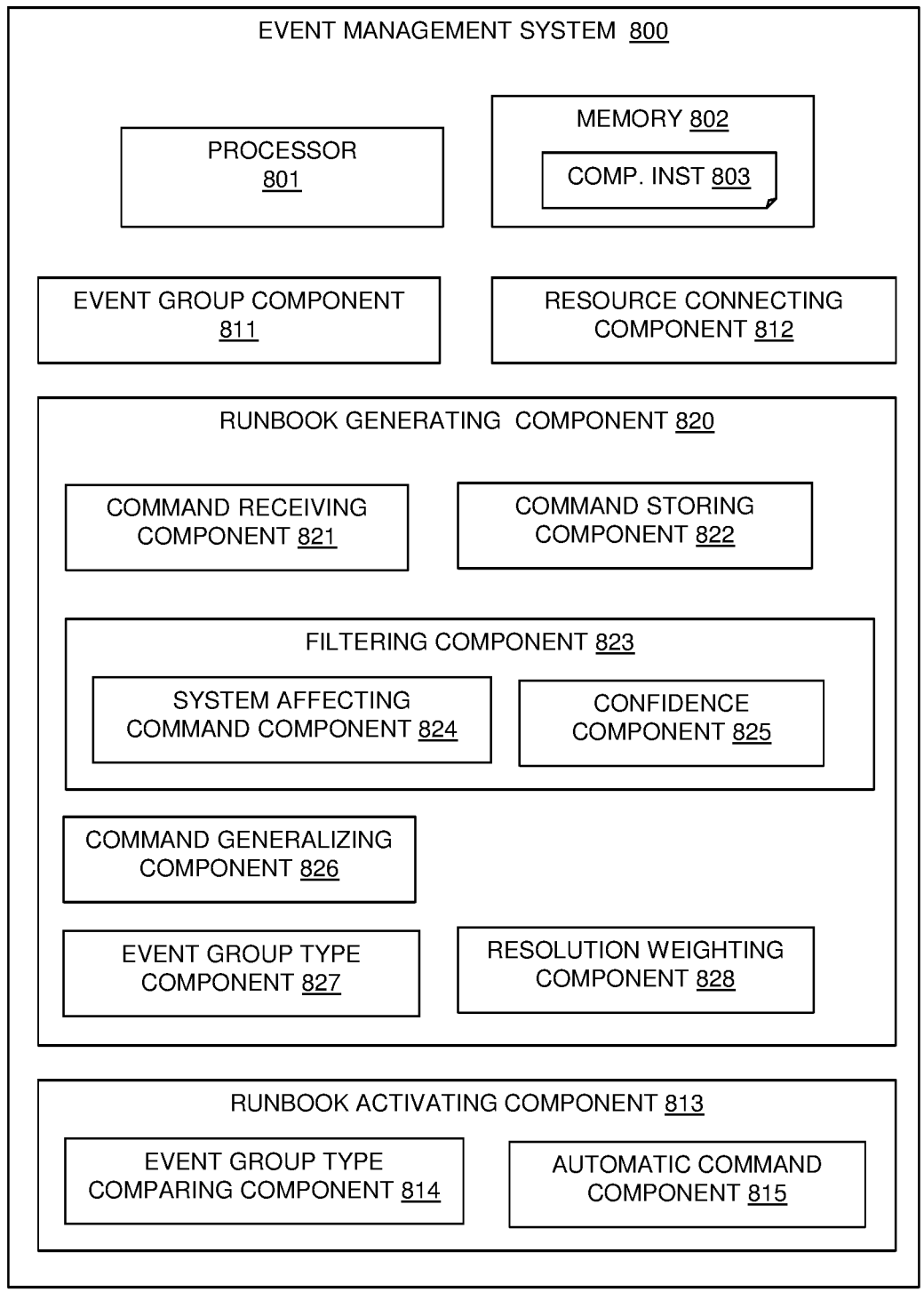
FIG. 8 is block diagram of an example embodiment of a system in accordance with the present invention.

Referring to FIG. 8, a block diagram shows an example embodiment of the described system in the form of an event management system including runbook generation. Event management system 800 includes at least one processor 801, a hardware module, or a circuit for executing the functions of the described components which may be software units executing on the at least one processor. Multiple processors running parallel processing threads may be provided enabling parallel processing of some or all of the functions of the components. In some embodiments, memory 802 is configured to provide computer instructions 803 to at least one processor 801 to carry out the functionality of the components.

In some embodiments, Event management system 800 includes event group component 811 for identifying an event group relating to an issue. This may include correlating multiple events that share a root cause into a single container as an event group relating to an issue.

In some embodiments, event management system 800 includes resource connecting component 812 receiving operator connection to a host to resolve the issue, extracting resource details from event metadata and connecting to affected resources.

In some embodiments, event management system 800 includes runbook generating component 820 including command receiving component 821 for receiving operator commands in a command line interface for an event group relating to and resolving an issue. Command receiving component 821 may receive operator commands from multiple command line interface sessions with operator commands including configuration change events.

In some embodiments, runbook generating component 820 includes command storing component 822 for storing the operator commands as related artifacts of the event group with mapping to affected resources.

In some embodiments, runbook generating component 820 includes filtering component 823 for filtering the operator commands to remove non-system affecting commands including system affecting command component 824 for comparing to known system affecting sets of commands Filtering component 823 includes confidence component 825 for calculating a confidence of each command being system affecting based on a combination of sources (in the event that the operator commands do not match known system affecting sets of commands).

In some embodiments, runbook generating component 820 includes command generalizing component 826 for matching arguments of the operator commands to event metadata fields of events in the event group to generalize the arguments to the event metadata. Command generalizing component 826 includes checking if an argument matches a metadata field of event metadata and, if there is no match, keeping the argument static, whereas if there is a match replacing the argument with parameters allowing the operator command to be used for other resources.

In some embodiments, runbook generating component 820 generate a runbook of generalized operator commands for future instances of an event group of a similar type and may include event group type component 827 for analyzing event group types and collating generalized commands run in the context of an event group type.

In some embodiments, runbook generating component 820 includes resolution weighting component 828 for applying a resolution weighting to generalized operator commands in a runbook based on a number of times the operator commands result in resolution of an issue.

In some embodiments, event management system 800 includes runbook activating component 813 for using a previously generated runbook for a new group of events. Runbook activating component 813 includes event group type comparing component 814 receiving a new event group for an issue and comparing it to similar event group types with generated runbooks of generalized operator commands.

Runbook activating component 813 includes automatic command component 815 for enabling automatic selection of operator commands with a predefined threshold resolution weighting.

Figure 9:
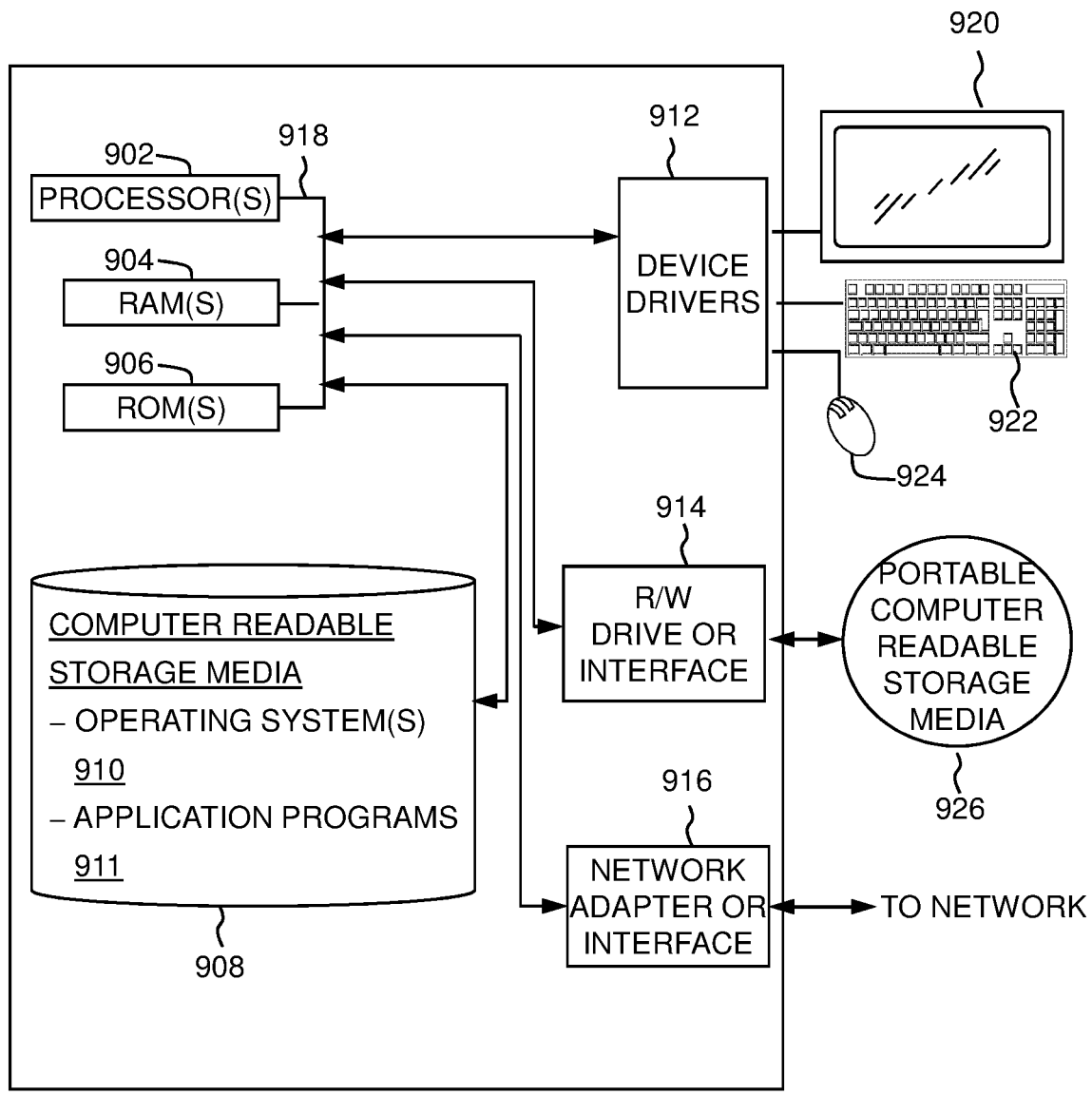
FIG. 9 is a block diagram of an embodiment of a computer system or cloud server in which the present invention may be implemented.

FIG. 9 depicts a block diagram of components of a computing device of event management system 800 of FIG. 8, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device can include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within the system.

One or more operating systems 910, and application programs 911, are stored on one or more of the computer readable storage media 908 for execution by one or more of the processors 902 via one or more of the respective RAMs 904 (which typically include cache memory). In the illustrated embodiment, each of the computer readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 914 to read from and write to one or more portable computer readable storage media 926. Application programs 911 on computing device can be stored on one or more of the portable computer readable storage media 926, read via the respective R/W drive or interface 914 and loaded into the respective computer readable storage media 908.

Computing device can also include a network adapter or interface 916, such as a TCP/IP adapter card or wireless communication adapter. Application programs 911 on computing device can be downloaded to the computing device from an external computer or external storage device via a network (for example, the Internet, a local area network or other wide area networks or wireless networks) and network adapter or interface 916. From the network adapter or interface 916, the programs may be loaded into the computer readable storage media 908. The network may comprise copper wires, optical fibers, wireless transmission, routers, firewalls, switches, gateway computers and edge servers.

Computing device can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 can comprise hardware and software stored in computer readable storage media 908 and/or ROM 906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
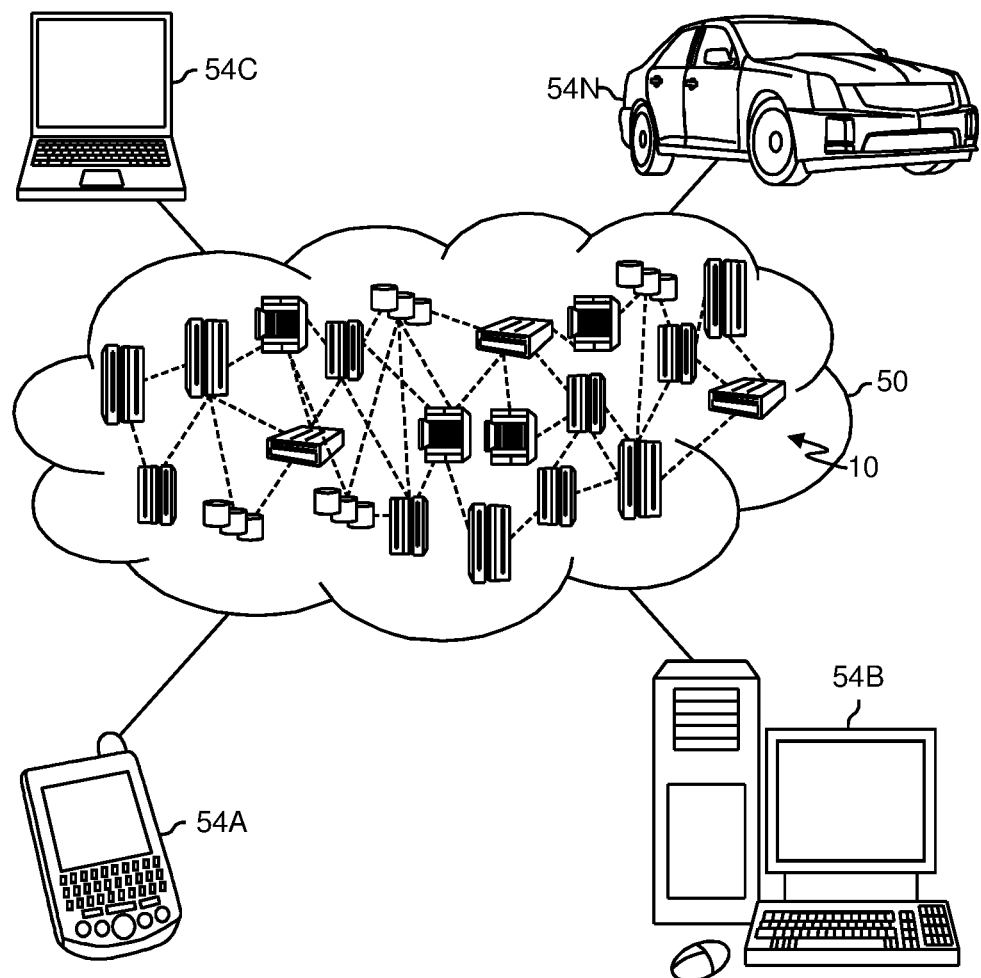
FIG. 10 is a schematic diagram of a cloud computing environment in which the present invention may be implemented.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
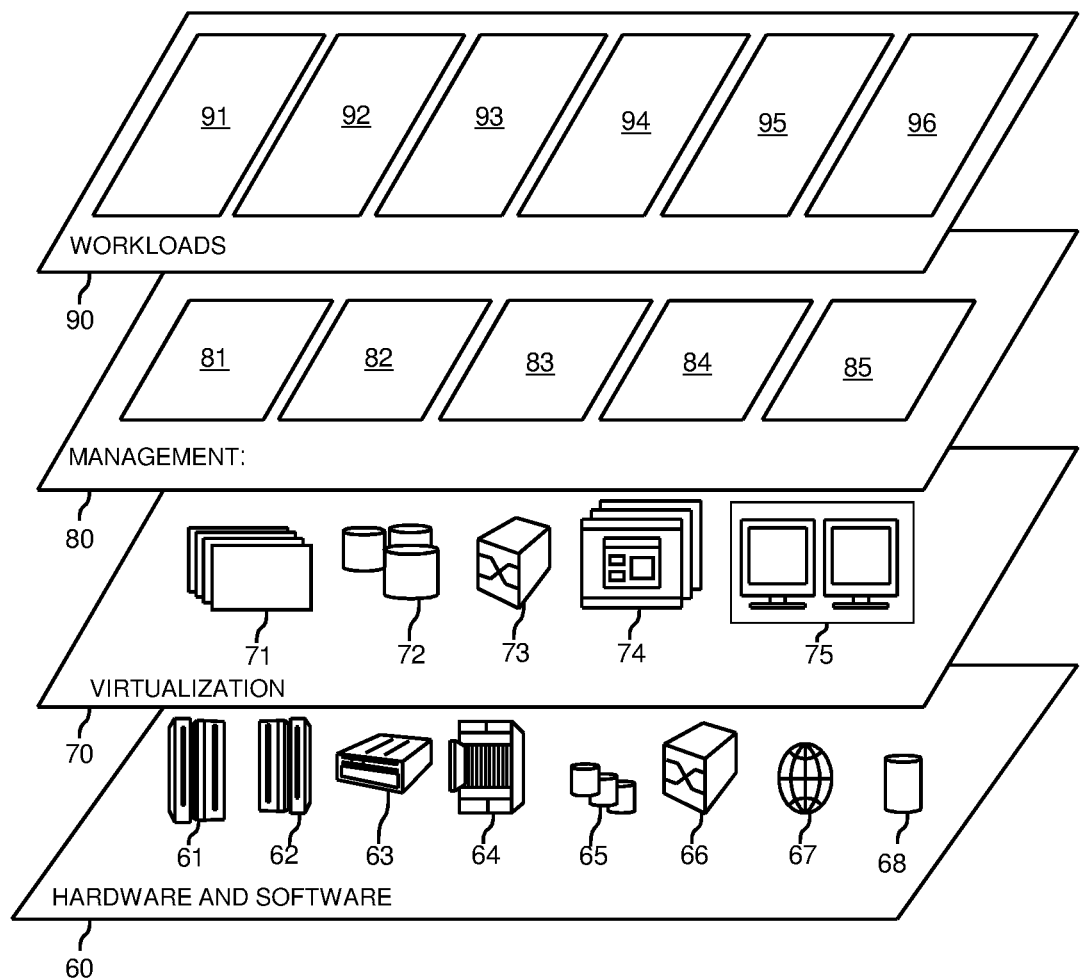
FIG. 11 is a diagram of abstraction model layers of a cloud computing environment in which the present invention may be implemented.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event management processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for generating runbooks for problem events, comprising:
   receiving operator commands in a command line interface for an event group relating to an issue, wherein the operator commands resolve the issue;
   determining that the received operator commands in the command line interface for the event group is designated as a non-system affecting command, with the designation being based, at least in part, upon a system affecting (SA) confidence score value being below a predefined SA confidence value threshold;

storing the operator commands as related artifacts of the event group with mapping to affected resources, with the related artifacts being: (i) the operator commands entered by the operator in a command line interface (CLI) for the event group, and (ii) stored in a manner such that the set of commands are linked;

filtering the operator commands to remove non-system affecting commands by comparing to known system affecting sets of commands;

matching arguments of the operator commands to event metadata fields of events in the event group to generalize the arguments to the event metadata; and generating a runbook of generalized operator commands for future instances of an event group of a similar type.

2. The method as claimed in claim 1, wherein generalizing the arguments to event metadata includes checking if an argument matches a metadata field of event metadata and, if there is no match, keeping the argument static whereas, if there is a match, replacing the argument with parameters allowing the operator command to be used for other resources.

3. The method as claimed in claim 1, wherein generating the runbook includes analyzing event group types and collating generalized commands run in the context of an event group type.

4. The method as claimed in claim 1, including:
applying a resolution weighting to generalized operator commands in a runbook based on a number of times the operator commands result in resolution of an issue; and
enabling automatic selection of operator commands with a predefined threshold weighting.

5. The method as claimed in claim 4, including:
receiving an event group for an issue and comparing it to similar event group types with generated runbooks of generalized operator commands; and
automatically applying generalized operator commands if their resolution weighting is above a predefined threshold weighting.

6. The method as claimed in claim 5, including:
increasing the resolution weighting for generalized operator commands if the issue is successfully resolved.

7. The method as claimed in claim 1, including:
identifying an event group relating to an issue and receiving operator connection to a host to resolve the issue; and
extracting resource details from event metadata and connecting to affected resources.

8. The method as claimed in claim 7, wherein receiving operator commands receives operator commands from multiple command line interface sessions with operator commands including configuration change events.

9. The method as claimed in claim 1, wherein, if the operator commands do not match known system affecting sets of commands, calculating a confidence of each command being system affecting based on a combination of sources.

10. A computer program product (CPP) for generating runbooks for problem events, the computer program product comprising:
a computer readable storage medium; and
computer code stored on the computer readable storage medium, with the computer code including program instructions executable by a processor(s) set to cause the processor(s) set to perform at least the following operations:
receive operator commands in a command line interface for an event group relating to an issue, wherein the operator commands resolve the issue,
determining that the received operator commands in the command line interface for the event group is designated as a non-system affecting command, with the designation being based, at least in part, upon a system affecting (SA) confidence score value being below a predefined SA confidence value threshold,
store the operator commands as related artifacts of the event group with mapping to affected resources, with the related artifacts being: (i) the operator commands entered by the operator in a command line interface (CLI) for the event group, and (ii) stored in a manner such that the set of commands are linked,
filtering the operator commands to remove non-system affecting commands by comparing to known system affecting sets of commands
match arguments of the operator commands to event metadata fields of events in the event group to generalize the arguments to the event metadata, and
generate a runbook of generalized operator commands for future instances of an event group of a similar type.

11. The CPP of claim 10 wherein the CPP is in the form of a computer system, and with the computer system further comprising:
the processor(s) set operatively connected in communication with the computer readable storage medium so that the processor(s) set can execute the program instructions.

12. The CPP as claimed in claim 10, wherein the command generalizing program instructions for generalizing the arguments to event metadata includes program instructions checking if an argument matches a metadata field of event metadata and, if there is no match, keeping the argument static whereas, if there is a match, replacing the argument with parameters allowing the operator command to be used for other resources.

13. The CPP as claimed in claim 10, wherein the runbook generating program instructions for generating the runbook includes an event group type program instructions for analyzing event group types and collating generalized commands run in the context of an event group type.

14. The CPP as claimed in claim 10, wherein the computer code further comprises program instructions for causing the processor(s) set to perform the following operations:
applying a resolution weighting to generalized operator commands in a runbook based on a number of times the operator commands result in resolution of an issue; and
enabling automatic selection of operator commands with a predefined threshold weighting.

15. The CPP as claimed in claim 10, wherein the computer code further comprises program instructions for causing the processor(s) set to perform the following operations:
identifying an event group relating to an issue and receiving operator connection to a host to resolve the issue; and
extracting resource details from event metadata and connecting to affected resources.

16. The CPP as claimed in claim 10, wherein the command receiving program instructions for receiving operator commands receives operator commands from multiple command line interface sessions with operator commands including configuration change events.

17. The CPP as claimed in claim 10, wherein the filtering program instructions include a confidence program instructions that, responsive to the operator commands not matching known system affecting sets of commands, calculate a confidence of each command being system affecting based on a combination of sources.

18. A method comprising:
   receiving a problem-resolution command data set including information indicative of: (i) a plurality of commands used to resolve a first occurrence of a problem event that occurred in operation of a first computer system, and (ii) each given command of the plurality of commands, argument value data respectively corresponding to value(s) of argument(s) of the given command;
   for each given argument value of each given argument data of each given command of the plurality of commands, determining, by machine logic, a machine logic formula for determining the given argument value based on characteristics and/or operational parameter values of computer systems other than the first computer system; and
   creating a first script for handling the problem event, the first script including: (i) the plurality of commands, and (ii) the machine logic formulas for given argument value.

\* \* \* \* \*